US012428872B2

(12) United States Patent
Dore Vasudevan et al.

(10) Patent No.: US 12,428,872 B2
(45) Date of Patent: Sep. 30, 2025

(54) LOCK DRIVE ASSEMBLIES

(71) Applicant: Schlage Lock Company LLC, Carmel, IN (US)

(72) Inventors: Sundar Raj Dore Vasudevan, Bangalore (IN); Dilip Bangaru, Bangalore (IN); Adam M. Litwinski, Centennial, CO (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 18/236,689

(22) Filed: Aug. 22, 2023

(65) Prior Publication Data

US 2024/0191543 A1 Jun. 13, 2024

Related U.S. Application Data

(62) Division of application No. 17/527,834, filed on Nov. 16, 2021, now Pat. No. 11,732,505, which is a (Continued)

(51) Int. Cl.
*E05B 47/00* (2006.01)
*E05B 15/04* (2006.01)
*E05B 47/06* (2006.01)

(52) U.S. Cl.
CPC ...... *E05B 47/0012* (2013.01); *E05B 47/0673* (2013.01); *E05B 2015/0406* (2013.01); *E05B 2047/0023* (2013.01)

(58) Field of Classification Search
CPC ........... Y10T 292/096; Y10T 292/0961; Y10T 292/0964; Y10T 292/0969;
(Continued)

(56) References Cited

U.S. PATENT DOCUMENTS 3,751,086 A 8/1973 Geringer
4,583,382 A 4/1986 Hull
(Continued)

FOREIGN PATENT DOCUMENTS

WO 2014028332 A1 2/2014

OTHER PUBLICATIONS

International Search Report; International Searching Authority; US Patent and Trademark Office; International Application No. PCT/US2015/048337; Feb. 1, 2016; 4 pages.
(Continued)

*Primary Examiner* — Alyson M Merlino
(74) *Attorney, Agent, or Firm* — Taft Stettinius & Hollister LLP

(57) ABSTRACT

An illustrative motor drive assembly is configured for use in a lockset comprising a case, a longitudinally movable link, and a catch configured to move among a locking position and an unlocking position in response to longitudinal movement of the link. The illustrative motor drive assembly includes a longitudinally extending shaft comprising a worm, a motor operable to rotate the shaft, a driver engaged with the worm, and a longitudinally extending spring. The spring is not directly engaged with the worm, and includes a first end coupled with the driver and a second end connectable with the link. Engagement between the worm and driver is configured to longitudinally move the driver in response to rotation of the shaft.

20 Claims, 8 Drawing Sheets

Related U.S. Application Data division of application No. 15/854,048, filed on Dec. 26, 2017, now Pat. No. 11,174,659, which is a division of application No. 14/476,159, filed on Sep. 3, 2014, now Pat. No. 9,850,685.

(58) Field of Classification Search

CPC ......... Y10T 292/0971; Y10T 292/0977; Y10T 292/098; Y10T 292/0982; Y10T 292/1016; Y10T 292/1021; Y10T 70/7062; Y10T 70/7102; Y10T 70/7113; Y10T 70/7119; Y10T 70/7124; Y10T 70/713; E05B 47/06; E05B 47/0603; E05B 47/0657; E05B 47/0665; E05B 47/0673; E05B 47/00; E05B 47/001; E05B 47/0012; E05B 2047/0014; E05B 2047/0015; E05B 2047/0016; E05B 2047/0017; E05B 2047/002; E05B 2047/0023; E05B 2047/0036; E05B 2047/0081; E05B 63/08

See application file for complete search history.

(56) References Cited

U.S. PATENT DOCUMENTS

| | | | |
|---|---|---|---|
| 5,083,122 | A | 1/1992 | Clark |
| 5,473,922 | A | 12/1995 | Bair et al. |
| 5,628,216 | A | 5/1997 | Qureshi et al. |
| 6,354,121 | B1 | 3/2002 | Frolov |
| 7,275,402 | B2 | 10/2007 | Luling et al. |
| 7,845,201 | B2 | 12/2010 | Meyerle et al. |
| 7,918,114 | B2 | 4/2011 | Walsh, III |
| 8,083,273 | B2 | 12/2011 | Yuan |
| 8,302,438 | B2 | 11/2012 | Lui |
| 8,671,723 | B2 | 3/2014 | Dayanikli et al. |
| 9,617,757 | B2 | 4/2017 | Lowder |
| 10,570,645 | B2 | 2/2020 | Ellis et al. |
| 2005/0050928 | A1 | 3/2005 | Frolov et al. |
| 2005/0218659 | A1 | 10/2005 | Geringer et al. |
| 2008/0303290 | A1 | 12/2008 | Yuan |
| 2010/0122561 | A1 | 5/2010 | Lui |
| 2010/0294008 | A1 | 11/2010 | Bogdanov et al. |
| 2011/0079057 | A1 | 4/2011 | Frolov et al. |
| 2011/0215597 | A1 | 9/2011 | Weum |
| 2012/0025984 | A1 | 2/2012 | Lu |
| 2012/0198897 | A1 | 8/2012 | Lui |
| 2012/0297842 | A1 | 11/2012 | Gartner |
| 2013/0043751 | A1 | 2/2013 | Yuan |
| 2015/0184425 | A1 | 7/2015 | Ellis et al. |
| 2016/0145904 | A1 | 5/2016 | Lowder |

OTHER PUBLICATIONS

Written Opinion; International Searching Authority; US Patent and Trademark Office; International Application No. PCT/US2015/048337; Feb. 1, 2016; 8 pages.

Canadian Office Action; Canadian Intellectual Property Office; Canadian Patent Application No. 3,069,364; Mar. 30, 2021; 4 pages.

Canadian Office Action; Canadian Intellectual Property Office; Canadian Patent Application No. 2,962,571; Feb. 18, 2020; 3 pages.

Canadian Office Action; Canadian Intellectual Property Office; Canadian Patent Application No. 2,962,571; Dec. 3, 2018; 3 pages.

Canadian Office Action; Canadian Intellectual Property Office; Canadian Patent Application No. 2,962,571; Jan. 10. 2018; 5 pages.

LOCK DRIVE ASSEMBLIES

CROSS-REFERENCE TO RELATED APPLICATIONS

The present application is a divisional of U.S. patent application Ser. No. 17/527,834 filed Nov. 16, 2021 and issued as U.S. Pat. No. 11,732,505, which is a divisional of U.S. patent application Ser. No. 15/854,048 filed Dec. 26, 2017 and issued as U.S. Pat. No. 11,174,659, which is a divisional of U.S. patent application Ser. No. 14/476,159 filed Sep. 3, 2014 and issued as U.S. Pat. No. 9,850,685, the contents of each application hereby incorporated by reference in their entirety.

TECHNICAL FIELD

The present invention generally relates to drive assemblies for electromechanical locks, and more particularly but not exclusively to drive assemblies for electromechanical mortise locksets.

BACKGROUND

Certain lock assemblies utilize an electromechanical actuator to transition the assembly between locked and unlocked states. Some such systems have certain limitations, such as failing to transition to a locked state when the handle is rotated. A need remains for further improvements in systems and methods for lock assemblies with electromechanical actuators.

SUMMARY

An illustrative motor drive assembly is configured for use in a lockset comprising a case, a longitudinally movable link, and a catch configured to move among a locking position and an unlocking position in response to longitudinal movement of the link. The illustrative motor drive assembly includes a longitudinally extending shaft comprising a worm, a motor operable to rotate the shaft, a driver engaged with the worm, and a longitudinally extending spring. The spring is not directly engaged with the worm, and comprises a first end coupled with the driver and a second end connectable with the link. Engagement between the worm and driver is configured to longitudinally move the driver in response to rotation of the shaft. Further embodiments, forms, features, and aspects of the present application shall become apparent from the description and figures provided herewith.

DETAILED DESCRIPTION OF ILLUSTRATIVE EMBODIMENTS

Figure 1:
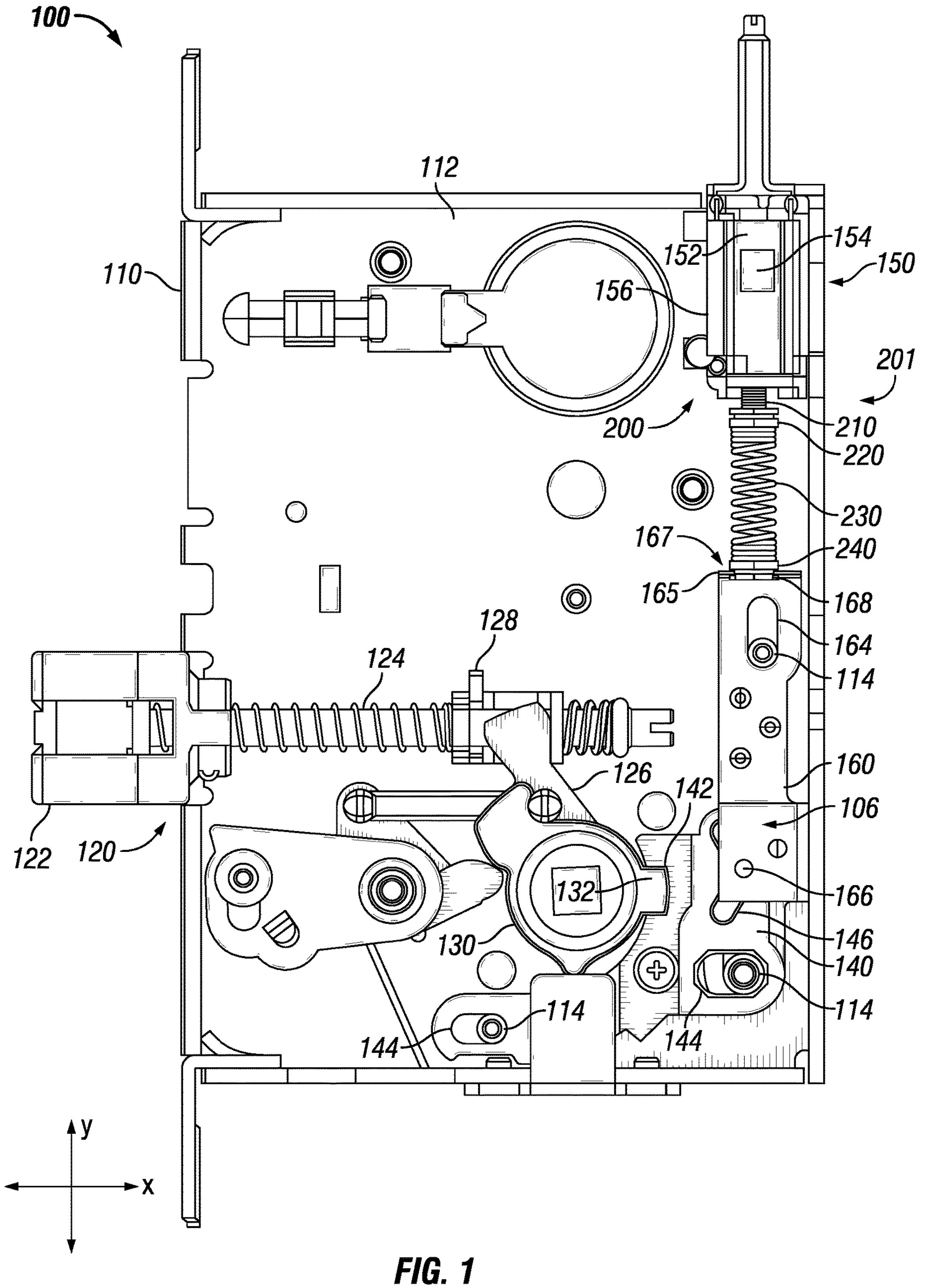
FIG. 1 illustrates one embodiment of a mortise lockset.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIGS. 1-5, a mortise lockset 100 according to one embodiment includes a case 110, a latch assembly 120, a hub 130 rotatably mounted in the case 110, a catch 140 slidably mounted in the case 110 and engageable with the hub 130, and a drive assembly 150 operably coupled with the catch 140. As described in further detail below, the drive assembly 150 is operable to move the catch 140 into and out of engagement with the hub 130 to lock and unlock the lockset 100. Certain features of the lockset 100 may, for example, be of the type described in the commonly-owned U.S. Pat. No. 4,583,382 to Hull, the contents of which are incorporated herein by reference in their entirety.

As used herein, the terms “longitudinal”, “lateral”, and “transverse” are used to denote motion or spacing along or substantially along three mutually perpendicular axes. In the coordinate plane illustrated in FIG. 1, the X-axis defines the lateral directions, the Y-axis defines the longitudinal directions (including a proximal direction and a distal direction), and an unillustrated Z-axis (perpendicular to the plane of the drawing) defines the transverse directions. These terms are used for ease of convenience and description, and are without regard to the orientation of the lockset 100 with respect to the environment. For example, descriptions that reference a longitudinal direction may be equally applicable to a vertical direction, a horizontal direction, or an off-axis orientation with respect to the environment. The terms are therefore not to be construed as limiting the scope of the subject matter described herein.

The case 110 is configured for mounting in a mortise cutout in a door (not illustrated), and includes a backplate 112 to which one or more elements of the lockset 100 may be coupled. The case 110 may further comprise a removable cover plate (not illustrated) configured to retain various elements of the lockset 100 within the case 110.

The latch assembly 120 includes a latch bolt 122 coupled with a drive bar 124, and a retractor 126 engaged with the drive bar 124 through a bracket 128. The retractor 126 is further engaged with the hub 130 such that the retractor 126 rotates in response to rotation of the hub 130 in the illustrated clockwise direction. As the retractor 126 rotates in the illustrated clockwise direction, it engages the bracket 128, thereby laterally moving the drive bar 124 and retracting the latch bolt 122. When the latch bolt 122 retracts to an unlatching position, the lockset 100 is in an unlatched state, and the door can be opened.

The hub 130 is rotationally coupled with an actuator (not illustrated) such as a lever or knob, such that the actuator is operable to retract the latch bolt 122 when the hub 130 is free to rotate. In the illustrated embodiment, the hub 130 is coupled with an exterior actuator on an unsecured side of the door, and the lockset 100 further comprises a second hub (not illustrated) coupled with an interior actuator on a secured side of the door. In other embodiments, the hub 130 may be configured for coupling to both an interior actuator and an exterior actuator. In the illustrated form, the hub 130 comprises a radial protrusion 132 operable to engage the catch 140. As described in further detail below, it is also contemplated that the hub 130 may define another form of an engagement feature such as, for example, a recess.

Figure 3:
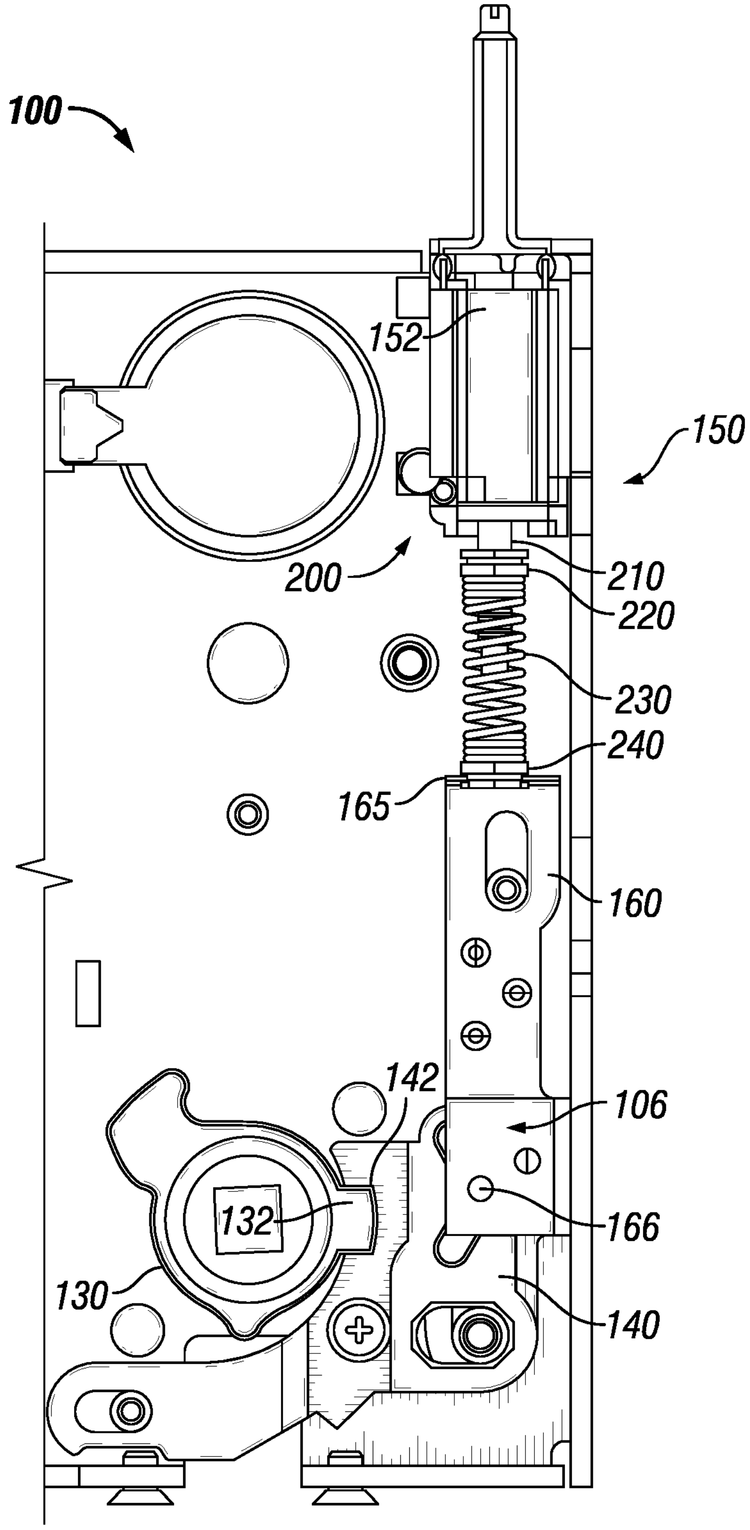
FIG. 3 depicts the mortise lockset in a locked state.
Figure 4:
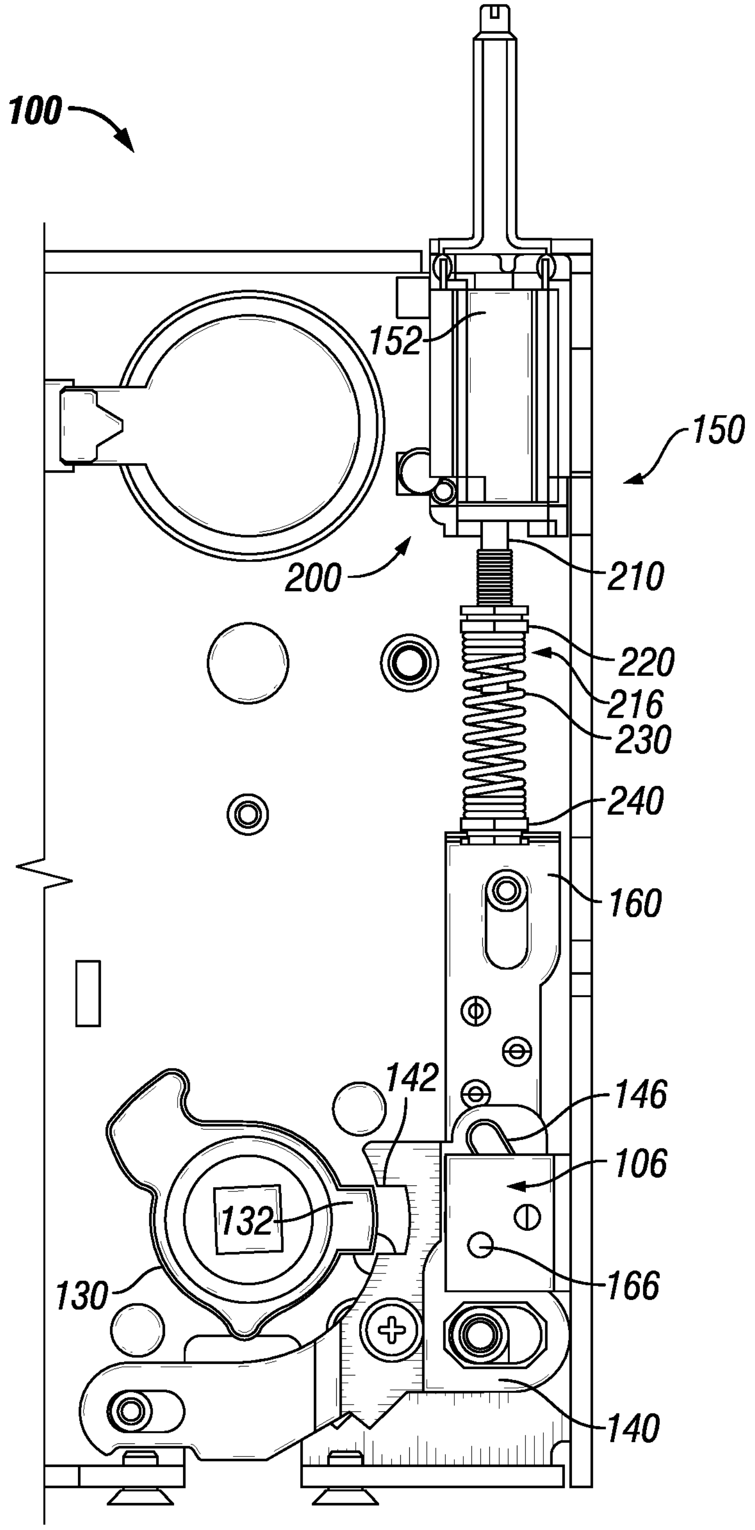
FIG. 4 depicts the mortise lockset in an unlocked state.

The exemplary catch 140 includes a recess 142 sized and configured to receive the protrusion 132, and is laterally movable among a locking position (FIG. 3) and an unlocking position (FIG. 4). The catch 140 may include one or more lateral slots 144 which receive posts 114 coupled with the backplate 112 such that the catch 140 is substantially confined to motion in the lateral directions. It is also contemplated that the catch 140 may be substantially confined to motion in the lateral directions by other features such as, for example, longitudinally spaced posts or walls positioned on opposite sides of the catch 140.

While the illustrated catch 140 is laterally movable between/among the locking and unlocking positions, it is also contemplated that the catch 140 may move between/among the locking and unlocking positions in another manner. In certain embodiments, the catch 140 may be linearly movable in another direction. For example, the catch 140 may move between the locking and unlocking positions in the longitudinal direction, or in a direction which is oblique with respect to the longitudinal and lateral directions. In other embodiments, the catch 140 may rotate or pivot while sliding between/among the locking and unlocking positions.

With the catch 140 in the unlocking position, the protrusion 132 is removed from the recess 142 and the catch 140 is disengaged from the hub 130. With the catch 140 disengaged from the hub 130, the hub 130 is free to rotate. The lockset 100 is thus in an unlocked state, as the latch bolt 122 can be retracted by rotation of the actuator to which the hub 130 is coupled. With the catch 140 in the locking position, the protrusion 132 is received in the recess 142 such that the catch 140 is engaged with the hub 130. With the catch 140 engaged with the hub 130, rotation of the hub 130 is substantially prevented. The latch bolt 122 therefore cannot be retracted by the actuator to which the hub 130 is coupled, thereby defining a locked state of the lockset 100. The term "substantially" as used herein may be applied to modify a quantitative representation which could permissibly vary without resulting in a change in the basic function to which it is related. For example, with the hub 130 engaged with the catch 140, the hub 130 may permissibly be capable of slight rotation, if the actuator to which the hub 130 is coupled remains unable to move the latch bolt 122 to the unlatching position.

In the illustrated form, the hub 130 and the catch 140 include mating engagement features in the form of the protrusion 132 and the recess 142. As noted above, however, it is also contemplated that other forms of mating engagement features may be utilized. For example, the catch 140 may include a protrusion, and the hub 130 may include a recess sized and configured to receive the protrusion on the catch 140. In other embodiments, the mating engagement features need not comprise a protrusion and a recess, and/or may comprise a plurality of protrusions and/or a plurality of recesses.

The exemplary drive assembly 150 includes a rotary motor 152, a controller 154 operable to drive the motor 152 in response to a received command, a link 160 slidably mounted in the case 110 and engaged with the catch 140, and a worm drive mechanism 200 operably coupling the link 160 and the motor 152. The motor 152 may be positioned in a housing 156 coupled with the case 110. As described in further detail below, the worm drive mechanism 200 is configured to translate rotary motion of the motor 152 to longitudinal movement of the link 160, which in turn moves the catch 140 among the locking and unlocking positions.

The illustrated link 160 is longitudinally slidable among a proximal link position (FIG. 3) and a distal link position (FIG. 4). The link 160 may include one or more longitudinal slots 164 which receive posts 114 coupled with the backplate 112 such that the link 160 is substantially confined to motion in the longitudinal direction. In other embodiments, the link 160 may be substantially confined to longitudinal movement by other features such as, for example, laterally spaced posts or walls on opposite sides of the link 160.

The link 160 is engaged with the catch 140 such that the catch 140 moves between/among the locking and unlocking positions in response to movement of the link 160 between/among the distal and proximal link positions. In the illustrated embodiment, the link 160 is engaged with the catch 140 via a cam interface 106. The cam interface 106 may include an angled slot 146 formed in the catch 140 and the pin 166 coupled with the link 160. With the catch 140 constrained to lateral movement and the link 160 constrained to longitudinal movement, engagement between the slot 146 and the pin 166 moves the catch 140 laterally in response to longitudinal movement of the link 160. In other embodiments, another form of a cam interface may be utilized. In further embodiments, the link 160 need not be coupled with the catch 140 through a cam interface 106. For example, in embodiments in which the catch 140 is longitudinally movable between/among the locking and unlocking positions, the link 160 may be fixedly coupled with the catch 140, or the catch 140 may be integrally formed with the link 160.

In the illustrated form, the catch 140 is in the locking position when the link 160 is in the proximal link position (FIG. 3), and is in the unlocking position when the link 160 is in the distal link position (FIG. 4). As such, the cam interface 106 is configured to move the catch 140 toward the unlocking position in response to distal movement of the link 160, and to move the catch 140 toward the locking position in response to proximal movement of the link 160. In other embodiments, the catch 140 may be in the locking position when the link 160 is in the distal link position, and may be un the unlocking position when the link 160 is in the proximal link position. In such embodiments, the cam interface 106 may be configured to move the catch 140 toward the unlocking position in response to proximal movement of the link 160, and to move the catch 140 toward the locking position in response to distal movement of the link 160.

Figure 2:
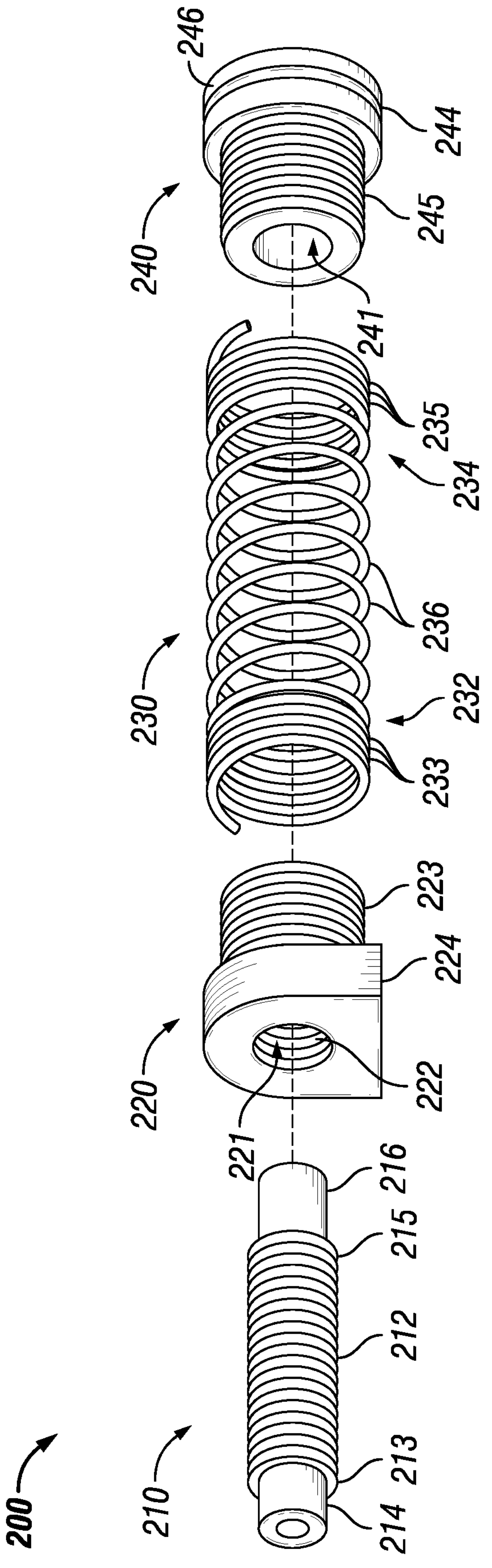
FIG. 2 is an exploded assembly view of one embodiment of a worm drive mechanism.

With specific reference to FIGS. 1 and 2, the illustrative worm drive mechanism 200 includes a shaft 210 including a worm 212, a driver 220 engaged with the worm 212, a spring 230 coupled with the driver 220, and a collar 240 coupling the spring 230 to the link 160. In the illustrated form, the driver 220, spring 230, and collar 240 are substantially coaxially aligned with the longitudinally extending shaft 210. In other embodiments, the shaft 210 may be laterally offset from one or more of the other elements of the worm drive mechanism 200.

The shaft 210 extends in the longitudinal direction and is engaged with the motor 152 such that the motor 152 is operable to rotate the shaft 210. In certain embodiments, the shaft 210 may extend into the motor 152 such that the motor 152 directly drives the shaft 210. In other embodiments, the shaft 210 may be coupled with an output shaft of the motor 152. The exemplary shaft 210 comprises the worm 212, and further comprises a proximal unthreaded portion 214 and a distal unthreaded portion 216 positioned on opposite sides of the worm 212. The worm 212 includes a proximal terminal thread 213 positioned adjacent the proximal unthreaded portion 214, and a distal terminal thread 215 positioned adjacent the distal unthreaded portion 216. It is also contemplated that one or both of the unthreaded portions 214, 216 may be omitted.

The driver 220 includes an opening 221 operable to receive the shaft 210, and internal threads 222 engageable with the worm 212. Engagement between the internal threads 222 and the worm 212 is configured to longitudinally displace the driver 220 in response to rotation of the shaft 210. The driver 220 may further include a post 224 which engages the backplate 112 and substantially prevents rotation of the driver 220. It is also contemplated that rotation of the driver 220 may be substantially prevented in another manner such as, for example, by a sleeve or laterally spaced walls positioned on opposite sides of the driver 220.

The spring 230 comprises a helical spring that includes a proximal first end 232 coupled with the driver 220, a distal second end 234 coupled with the collar 240, and helical coils 236 connecting the proximal and distal ends 232, 234. In the illustrated form, the spring proximal end 232 includes tightly wound coils 233 matingly engaged with external threads 223 on the driver 220, and the spring distal end includes tightly wound coils 235 matingly engaged with external threads 245 on the collar 240. In other embodiments, the spring 230 may be coupled to the driver 220 and/or the collar 240 in another manner. For example, an end of the spring 230 may comprise a hook which engages a tab on the driver 220 or the collar 240, or the spring 230 may be mechanically fastened to the driver 220 and/or the collar 240 by an adhesive or other fastening techniques or devices.

The collar 240 is configured to connect the link 160 to the spring 230, and may include an opening 241 sized to receive the shaft 210 such that the collar 240 does not engage the shaft 210 as the collar 240 moves longitudinally. While other forms of connection between the collar 240 and the link 160 are contemplated, the illustrated collar 240 includes a circumferential channel 244, and the link 160 includes a wall 165 defining a slot 167 having an edge 168. The circumferential channel 244 extends radially inward from a radially outer surface 246 of the collar 240, and is formed along at least a portion of the circumference of the collar 240. When assembled, the collar 240 is seated in the slot 167 such that the edge 168 is received in the channel 244, thereby coupling the collar 240 to the link 160. In the illustrated form, the collar 240 substantially defines a plurality of circular cylinders. It is also contemplated that the collar 240 may have another geometry. For example, the collar 240 may define one or more prisms having a polygonal cross-section.

Figure 5:
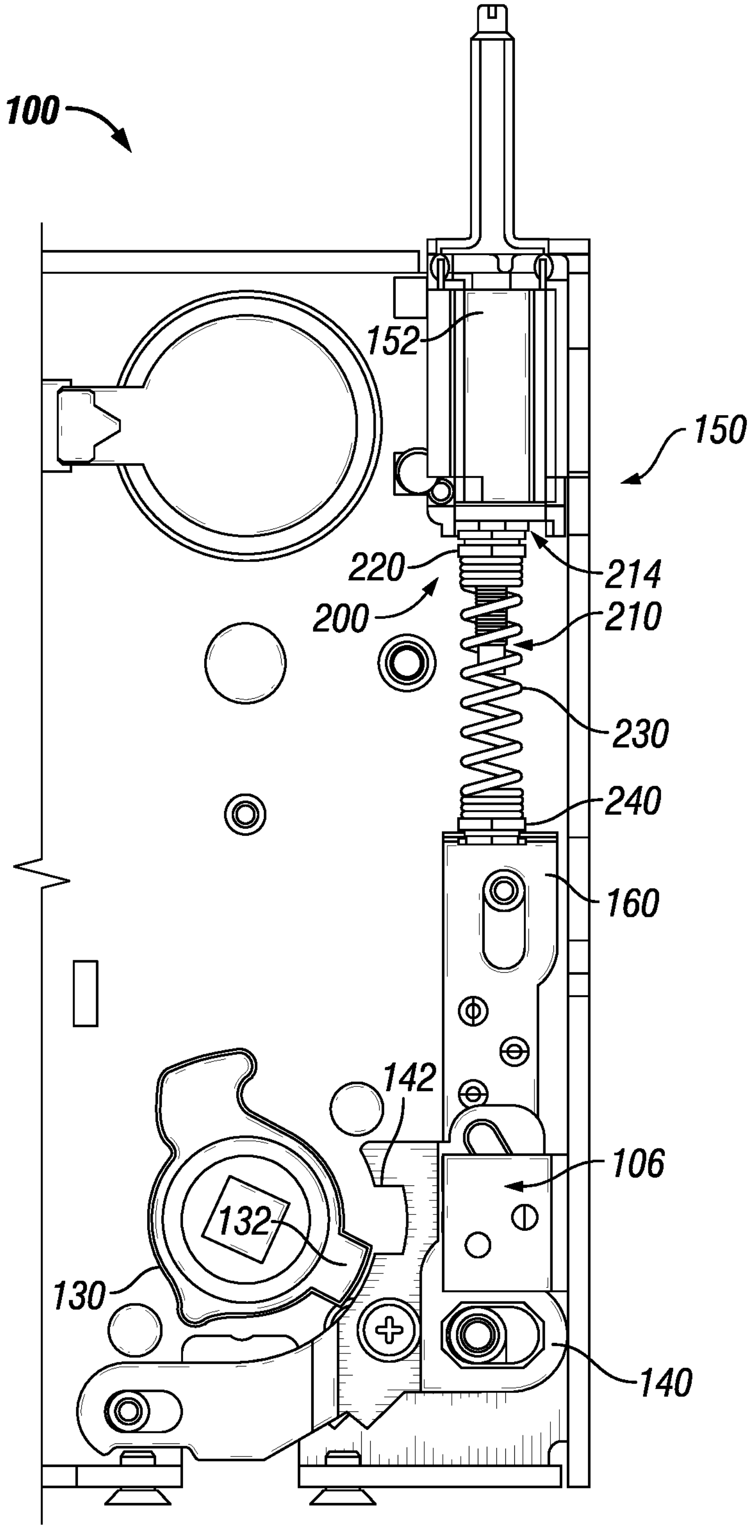
FIG. 5 depicts the mortise lockset in a blocked state.

FIGS. 3-5 illustrate the lockset 100 in the locked state (FIG. 3), the unlocked state (FIG. 4), and a blocked state (FIG. 5). In these figures, various elements of the lockset 100 are omitted for clarity. In the locked state (FIG. 3), the link 160 is positioned in the proximal link position, thereby placing the catch 140 is in the locking position. In the unlocked state (FIG. 4), the link 160 is positioned in the distal link position, thereby placing the catch 140 in the unlocking position. In the blocked state (FIG. 5), the hub protrusion 132 is misaligned with the catch recess 142, and the hub 130 prevents the catch 140 from moving to the locking position.

In order to transition the lockset 100 between the locked and unlocked states, the motor 152 may be operated in an unlocking mode to urge the catch 140 toward the unlocking position, and in a locking mode to urge the catch 140 toward the locking position. The controller 154 may be configured to selectively drive the motor 152 in the locking and locking modes in response to one or more commands. For example, the controller 154 may be in communication with a credential reader or a control system (not illustrated), and may drive the motor 152 in the unlocking mode in response to an unlocking command, and may drive the motor 152 in the locking mode in response to a locking command.

When driven in the unlocking mode, the motor 152 rotates the shaft 210 in a first rotational direction. As the shaft 210 rotates, the worm 212 engages the internal threads 222, thereby moving the driver 220 distally. As the driver 220 moves in the distal direction, the spring 230 urges the link 160 toward the distal link position. When operating in the locking mode, the motor 152 rotates the shaft 210 in a second rotational direction. As the shaft 210 rotates, the worm 212 engages the internal threads 222, thereby moving the driver 220 proximally. As the driver 220 moves in the proximal direction, the spring 230 urges the link 160 toward the proximal link position. With the link 160 in the proximal link position (FIG. 3), the distal end of the shaft 210 may or may not extend into the collar opening 241.

In the illustrated embodiment, the lockset 100 is in the unlocked state with the link 160 in the distal link position. As such, the first rotational direction is one in which the worm 212 urges the driver 220 in the distal direction, and the second rotational direction is one in which the worm 212 urges the driver 220 in the proximal direction. In embodiments in which the lockset 100 is in the unlocked state with the link 160 in the proximal link position, the first rotational direction may be one in which the worm 212 urges the driver 220 in the proximal direction, and the second rotational direction may be one in which the worm 212 urges the driver 220 in the distal direction.

In embodiments in which the shaft 210 includes the unthreaded portions 214, 216, longitudinal displacement of the driver 220 may be constrained between a distal driver position and a proximal driver position. For example, when the motor 152 is driven in the unlocking mode, the engagement between the worm 212 and the internal threads 222 urges the driver 220 distally. When the driver 220 becomes aligned with the distal unthreaded portion 214, the internal threads 222 are engaged with the end of the distal terminal thread 213, and the driver 220 is in the distal driver position (FIG. 4). With the driver 220 in the distal driver position, further rotation of the shaft 210 in the first rotational direction causes the end of the distal terminal thread 213 to rotate out of engagement with the internal threads 222, thereby preventing further distal movement of the driver 220.

Similarly, when the motor 152 is operating in the locking mode, the engagement between the worm 212 and the internal threads 222 urges the driver 220 proximally. When the driver 220 becomes aligned with the proximal unthreaded portion 216, the internal threads 222 are engaged with the end of the proximal terminal thread 215, and the driver 220 is in the proximal driver position (FIG. 3). With the driver 220 in the proximal driver position, further rotation of the shaft 210 in the second rotational direction causes the end of the proximal terminal thread 215 to rotate out of engagement with the internal threads 222, thereby preventing further proximal movement of the driver 220.

The physical characteristics of the spring 230 and/or the worm 212 may be selected such that the spring 230 is elastically deformed when the driver 220 is in the distal driver position and/or the proximal driver position. For example, the spring 230 may be stretched when the driver 220 and link 160 are in their respective proximal positions (FIG. 3). In such embodiments, the stretched spring 230 may distally urge the driver 220 into contact with the proximal terminal thread 213. When the shaft 210 is rotated in the second rotational direction with the driver 220 in the proximal driver position, the spring 230 may move the driver 220 distally as the end of the proximal terminal thread 213 rotates out of engagement with the internal threads 222. When the shaft 210 is subsequently rotated in the first rotational direction, the worm 212 may quickly engage the internal threads 222 and the driver 220 begins moving in the distal direction.

Similarly, the spring 230 may be compressed when the driver 220 and link 160 are in their respective distal positions (FIG. 4). In such embodiments, the compressed spring 230 may proximally urge the driver 220 into contact with the distal terminal thread 215. When the shaft 210 is rotated in the first rotational direction with the driver 220 in the distal driver position, the spring 230 may displace the driver 220 proximally as the end of the distal terminal thread 215 rotates out of engagement with the internal threads 222. When the shaft 210 is subsequently rotated in the second rotational direction, the worm 212 may quickly engage the internal threads 222 such that the driver 220 begins moving in the proximal direction.

As should be understood from the foregoing, in the illustrated embodiment, with the driver 220 in the distal driver position, rotation of the shaft 210 in the first rotational direction does not cause the driver 220 to distally move beyond the distal driver position. Similarly, with the driver 220 in the proximal driver position, rotation of the shaft 210 in the second rotational direction does not cause the driver 220 to proximally move beyond the proximal driver position. Thus, the unthreaded portions 214, 216 are portions of the shaft 210 that are structured and positioned to not translate rotary motion of the shaft 210 to longitudinal movement of the driver 220. In the illustrated embodiment, each of the unthreaded portions 214, 216 is devoid of threads. However, in other embodiments, one or more of the unthreaded portions 214, 216 may include threads having a diameter less than that of the worm 212 such that the unthreaded portions 214, 216 remain inoperable to engage the internal threads 222 of the driver 220.

With specific reference to FIG. 5, if the hub 130 is rotated such that the protrusion 132 is misaligned with the recess 142, the hub 130 prevents the catch 140 from moving to the locking position, and the catch 140 prevents the link 160 from moving to the proximal link position. If the motor 152 is driven in the locking mode with the hub 130 rotated, the worm 212 moves the driver 220 to the proximal driver position, but the link 160 prevents the collar 240 from moving proximally, thereby resulting in the blocked state depicted in FIG. 5. The spring 230 thus becomes stretched between the driver 220 and the collar 240, mechanically storing the energy required to move the link 160 to the proximal link position. When the protrusion 132 becomes aligned with the recess 142 (for example, when the actuator to which the hub 130 is coupled returns to a home position), the catch 140 becomes free to move to the locking position. The spring 230 then contracts and urges the link 160 to the proximal link position with the stored mechanical energy. As the link 160 moves to the proximal link position, the cam interface 106 moves the catch 140 to the locking position, thereby returning the lockset 100 to the locked state (FIG. 3).

Those having skill in the art will readily realize that in embodiments in which the lockset 100 is in the unlocked state when the link 160 is in the proximal link position, the spring 230 may be compressed when the lockset 100 is in the blocked state. That is to say that with the link 160 trapped in the proximal (unlocking) link position, driving the motor 152 in the locking mode moves the driver 220 to the distal driver position, while the link 160 prevents the collar 240 from moving distally. When the protrusion 132 subsequently becomes aligned with the recess 142, the spring 230 may expand, thereby urging the link 160 to the distal link position with the stored mechanical energy.

With specific reference to FIG. 1, the lockset 100 is illustrated as including the drive assembly 150. However, in other embodiments, all or a portion of the illustrated drive assembly 150 may be configured for use with a lockset such as the lockset 100, but need not be included in a lockset at the time of sale. For example, a motor drive assembly 201 according to one embodiment is configured for use in the lockset 100 which includes the hub 130, the catch 140, and the link 160. The motor drive assembly 201 may include the motor 152, the controller 154, and the worm drive mechanism 200. Additionally, the motor drive assembly 201 may be a retrofit kit configured to replace a solenoid actuator. The motor drive assembly 201 may additionally or alternatively be configured to replace a solenoid in other forms of lockset such as, for example, a lockset in which the catch moves parallel or at an oblique angle with respect to the longitudinal movement of the driver 220.

Figure 6:
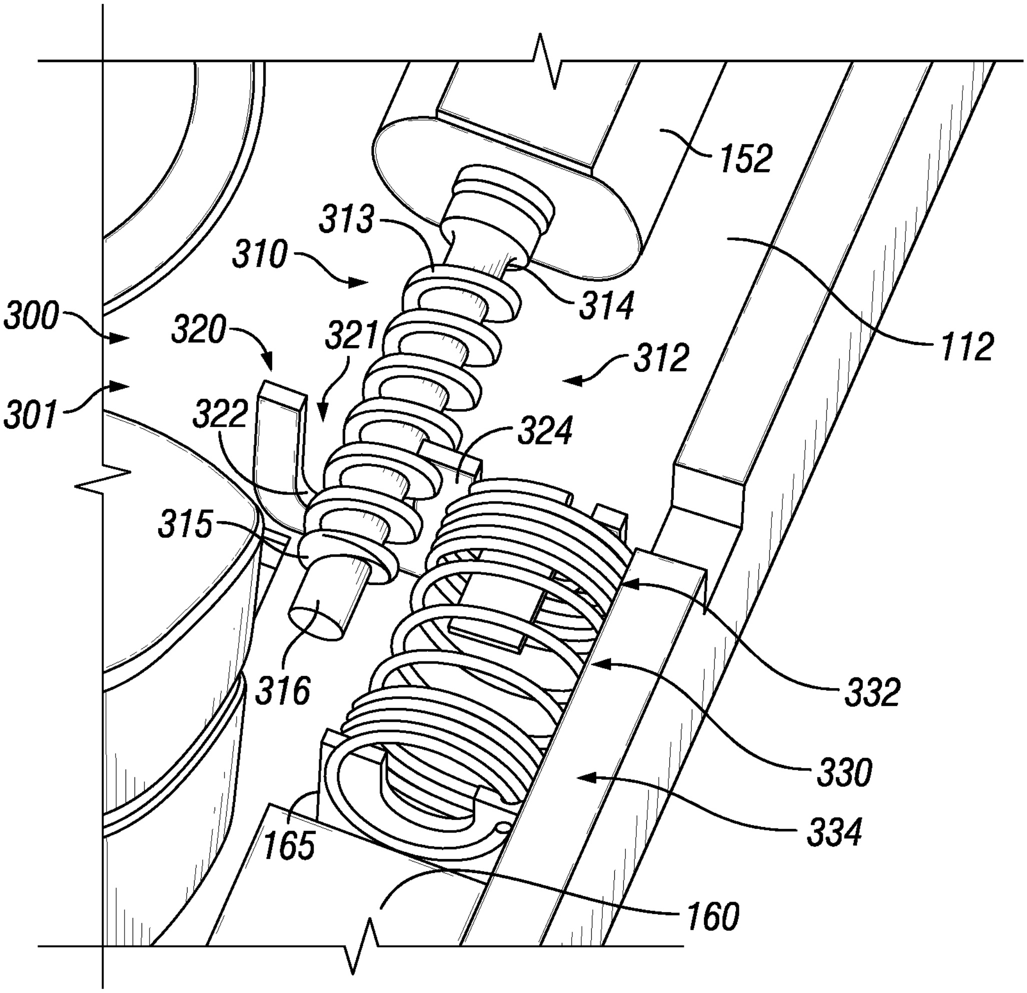
FIGS. 6-9 depict motor drive assemblies according to further embodiments.
Figure 7:
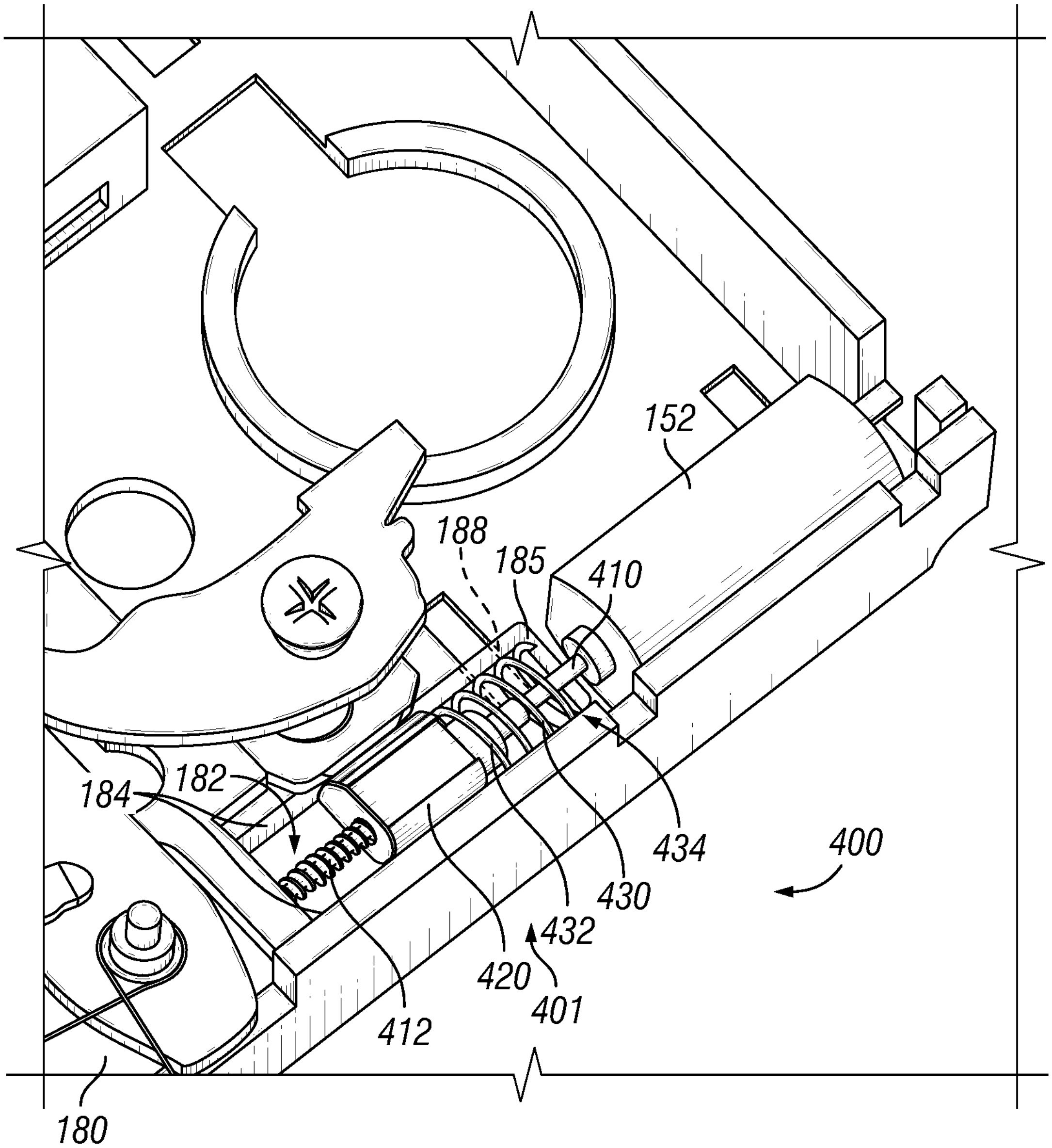

FIGS. 6 and 7 depict motor drive assemblies including worm drive mechanisms according to other embodiments. Each of the worm drive mechanisms is substantially similar to the worm drive mechanism 200. Unless indicated otherwise, similar reference characters are used to indicate similar elements and features. In the interest of conciseness, the following descriptions focus primarily on features that are different than those described above with regard to the worm drive mechanism 200.

With reference to FIG. 6, a worm drive mechanism 300 according to a second embodiment comprises a shaft 310 including a worm 312, a driver 320 engaged with the worm 312, and a spring 330 connecting the driver to the link 160. While various elements of the above-described worm drive mechanism 200 were substantially coaxial, certain elements of the instant worm drive mechanism 300 are laterally offset with respect to one another. The worm drive mechanism 300 may comprise a portion of a motor drive assembly 301 according to a second embodiment, which may further comprise the motor 152 and a controller (not illustrated). The motor drive assembly 301 may be a retrofit kit which may be configured to replace a solenoid.

As noted above, the worm drive mechanism is similar to the worm drive mechanism 200, and similar reference characters are used to indicate similar elements and features. For example, the shaft 310 includes a proximal terminal thread 313 adjacent a proximal unthreaded portion 314, and a distal terminal thread 315 positioned adjacent a distal unthreaded portion 316.

The driver 320 includes an opening 321 in the form of a slot having an edge 322. The shaft 310 is received in the opening 321, and the edge 322 is engaged with the worm 312. Engagement between the edge 322 and the worm 312 is operable to longitudinally move the driver 320 in response to rotation of the shaft 310. The opening 321 and edge 322 may be defined by a wall 324, which may in turn engage the back plate 112 to substantially prevent rotation of the driver 320 in a manner similar to that described above with regard to the post 224.

The spring 330 is laterally offset relative to the shaft 310. The spring proximal end 332 is coupled with the driver 320, and the spring distal end 334 is coupled with the link 160. In the illustrated form, the driver wall 324 is wedged between tightly wound coils of the spring proximal end 332, and the link wall 165 is wedged between tightly wound coils of the spring distal end 334. It is also contemplated that the worm drive mechanism 300 may comprise one or more collars coupling the spring 330 to the driver 320 and/or the link 160. Additionally, the one or more collars may be substantially similar to the above-described collar 240.

With reference to FIG. 7, a worm drive mechanism 400 according to a third embodiment comprises a shaft 410 including a worm 412, a driver 420 engaged with the worm 412, and a spring 430 connecting the driver 420 to a link 180. The worm drive mechanism 400 may comprise a portion of a motor drive assembly 401 according to a third embodiment, which may further comprise the motor 152, a controller (not illustrated), and the link 180. The motor drive assembly 401 may be a retrofit kit which may be configured to replace a solenoid. In embodiments in which the motor drive assembly 401 is a retrofit kit, the link 180 may be a retrofit link configured to replace an existing link in a lockset.

The link 180 includes a link wall 185 positioned between the driver 420 and the motor 152. The link 180 may further comprise a chamber 182 in which the driver 420 is seated. The chamber 182 may be defined, at least in part, by laterally offset sidewalls 184 and the link wall 185. The chamber 182 may be further defined by a ceiling 188 (shown in phantom), and the driver 420 may be positioned between the ceiling 188 and the backplate 112. The non-illustrated distal portion of the link 180 may be substantially similar to that of the above-described link 160 such as, for example, in embodiments in which the motor drive assembly 401 is a retrofit kit configured for use with the above-described lockset 100. It is also contemplated that the distal portion of the link 180 may take another form such as, for example, in embodiments in which the motor drive assembly 401 is a retrofit kit configured for use in another form of a lockset.

In the illustrated form, the worm 412 is rotationally coupled with the shaft 410, but is not integrally formed with the shaft 410 to define a one-piece, unitary structure. The worm 412 may be rotationally coupled with the shaft 410 via a snap-fit connection, a splined connection, or any other form of rotational coupling. In other embodiments, the worm 412 may be integrally formed with the shaft 410 to define a one-piece, unitary structure. The shaft 410 and/or the worm 412 extend into the chamber 182 through a slot formed in the link wall 185 such that the worm 412 is positioned at least partially within the chamber 182.

The driver 420 is seated in the chamber 182, and includes internal threads (not illustrated) engaged with the worm 412. Rotation of the driver 420 may be substantially prevented, for example, by engagement of the driver 420 with the link 180 and/or the backplate 112. In certain embodiments, one or both of the sidewalls 184 may engage the laterally opposite sides of the driver 420 to substantially prevent rotation thereof. In other embodiments, the backplate 112 and/or the ceiling 188 may engage transversely opposite sides of the driver 420 to substantially prevent rotation thereof. In further embodiments, the chamber 182 may closely engage the driver 420 to substantially prevent rotation thereof.

The spring 430 is positioned in the chamber 182 between the driver 420 and the link wall 185, and the link wall 185 is positioned between the spring 420 and the motor 152. The diameter of the spring 430 may correspond to the lateral distance separating the sidewalls 184 such that the sidewalls 184 substantially prevent buckling of the spring 430 when the spring 430 is compressed. Additionally or alternatively, the diameter of the spring 430 may correspond to the transverse distance between the backplate 112 and the ceiling 188 such that the backplate 112 and the ceiling 188 substantially prevent buckling of the spring 430 as the spring 430 is compressed.

The spring 430 comprises a first end 432 coupled with the driver 420, and a second end 434 coupled with the link 180. Due to the fact that the driver 420 is positioned distally of the spring 430, the spring first end 432 is the distal end of the spring 430, and the spring second end 434 is the proximal end of the spring 430. The spring first end 432 may, for example, be coupled with the driver 420 by engagement of a tab formed on the driver 420 and a hook formed on the spring first end 432. The spring second end 434 may, for example, be coupled with the link 180 via a collar, or the link wall 185 may be wedged between tightly wound coils of the spring second end 434.

Figure 9:
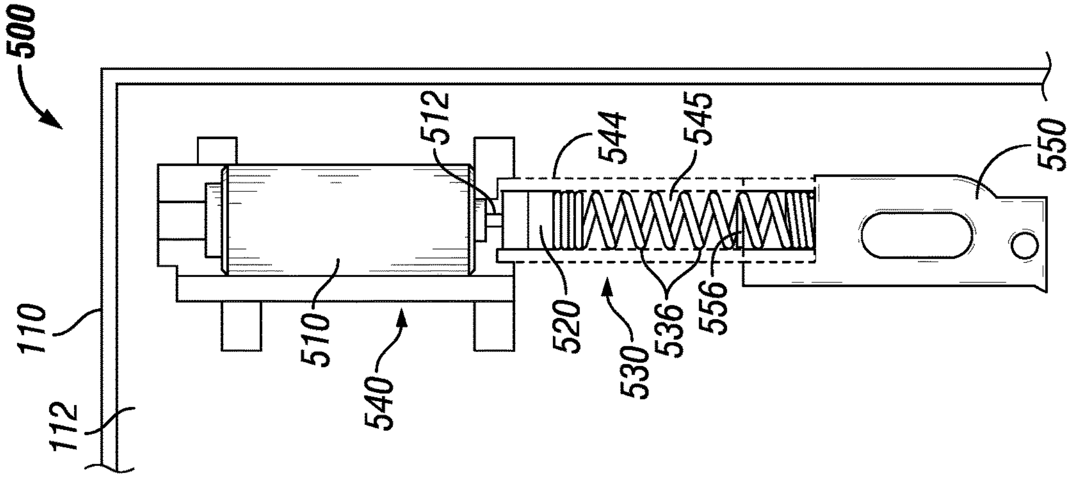
Figure 8:
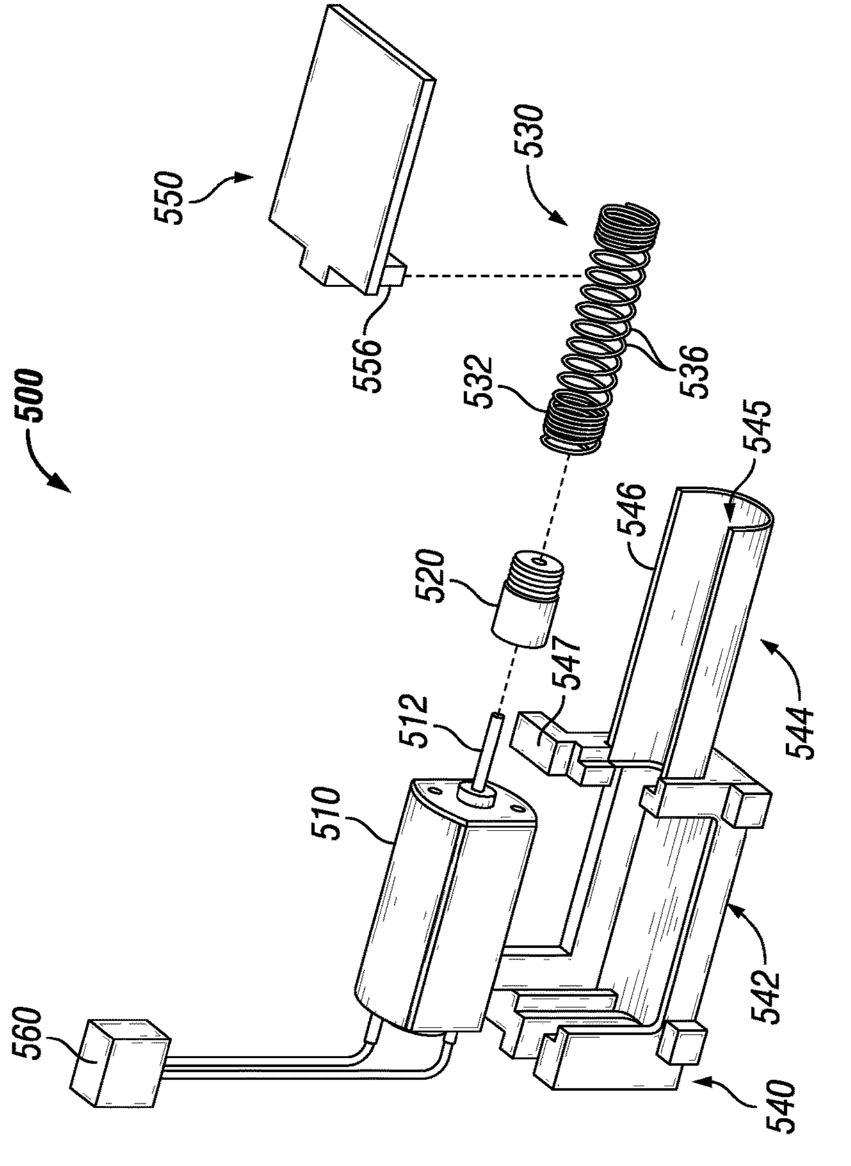

FIGS. 8 and 9 depict a motor drive assembly 500 according to another embodiment. The motor drive assembly 500 comprises a motor 510 including a shaft 512 rotatable by the motor 510, a coupler 520 rotationally coupled with the shaft 512, a spring 530 rotationally coupled with the coupler 520, and a housing 540 in which the motor 510 and spring 530 are positioned. The motor drive assembly 500 may further include a link 550 engaged with the spring 530, and/or a controller 560 similar to the above-described controller 154. The motor drive assembly 500 is configured to translate rotary motion of the shaft 512 to longitudinal motion of the link 550.

The motor drive assembly 500 may be utilized in a mortise lockset similar to the lockset 100 depicted in FIG. 1. For example, the above-described lockset 100 may include the motor drive assembly 500 in place of the above-described drive assembly 150, or the motor drive assembly 500 may be a retrofit kit for the lockset 100. In such forms, the link 550 may be considered a retrofit link, and the non-illustrated distal portion of the link 550 may be configured in a manner similar to that of the above-described link 160. In embodiments in which the motor drive assembly 500 is a retrofit kit for another form of lockset, the distal portion of the link 550 may be configured in a manner similar to the link of the lockset for which the motor drive assembly 500 is designed as a retrofit kit.

The spring 530 is engaged with the link 550 such that the link 550 moves longitudinally in response to rotation of the spring 530. For example, the link 550 may comprise a flange 556 extending transversely into the spring 530 such that the spring coils 536 distally urge the link 550 as the spring 530 rotates in a first rotational direction, and proximally urge the link 550 as the spring 530 rotates in a second rotational direction. The coupler 520 and the spring 530 may, for example, be of the type described in the commonly-owned U.S. Patent Application Publication No. 2010/0294008 to Bogdanov et al., FIGS. 4-9 and paragraphs through of which are incorporated herein by reference.

The housing 540 comprises a motor housing 542 and a longitudinally extending sleeve 544 including a channel 545. The motor 510 is seated in the motor housing 542, and the coupler 520 and the spring 530 are seated in the sleeve 544 such that the spring 530 longitudinally extends along the channel 545. In the illustrated embodiment, a rear surface 546 of the sleeve 544 may be transversely offset from a rear surface 547 of the motor housing 542. As such, when the housing 540 is coupled with the case 110 (FIG. 9), the sleeve rear surface 546 is transversely offset from the backplate 112. In other embodiments, the sleeve rear surface 546 may abut the backplate 112 when the housing 540 is installed in the case 110.

When assembled (FIG. 9), the flange 556 extends into channel 545 and is positioned between adjacent coils 536. In the illustrated form, the link 550 is positioned between the sleeve rear surface 546 and the backplate 112. It is also contemplated that the rear surface of the link 550 may be aligned with the sleeve rear surface 546 such as, for example, in embodiments in which the sleeve rear surface 546 abuts the backplate 112. In such embodiments, the link 550 may include a longitudinal arm (not illustrated) extending into the channel 545, and the flange 556 may be defined by the arm.

If the link 550 is blocked from longitudinal movement, rotation of the shaft 512 may cause the spring 530 to elastically deform in a manner similar to that described above with reference to FIG. 5. The channel 545 may have a lateral width corresponding to the outer diameter of the spring 530, and the flange 556 may have a lateral width corresponding to that of the channel 545.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of retrofitting an existing mortise lockset comprising a rotatable hub, a catch operable to selectively prevent rotation of the rotatable hub, and a solenoid actuator operable to drive the catch between a locking position and an unlocking position, the method comprising:

removing the solenoid actuator from the existing mortise lockset;

installing a rotary motor to the existing mortise lockset, the rotary motor including a shaft comprising a worm, wherein the shaft extends along a longitudinal axis defining a proximal direction and an opposite distal direction, and wherein the shaft extends in the distal direction;

engaging a proximal end portion of a coil spring with the worm such that the coil spring is prevented from rotating when the rotary motor is operated to rotate the worm; and securing a distal end portion of the coil spring with a link such that the coil spring is positioned between the worm and the link, wherein the link is engaged with the catch such that when the rotary motor is operated to rotate the worm, the link is moved between a first link position and a second link position so as to drive the catch between the locking position and the unlocking position.

2. The method of claim 1, wherein engaging the proximal end portion of the coil spring with the worm comprises indirectly engaging the proximal end portion of the coil spring with the worm via a driver.

3. The method of claim 1, wherein securing the distal end portion of the coil spring with the link comprises indirectly coupling the distal end portion of the coil spring with the link via a collar.

4. The method of claim 1, wherein securing the distal end portion of the coil spring with the link comprises rotationally coupling the distal end portion of the coil spring with the link.

5. The method of claim 1, further comprising installing the link and engaging the link with the catch.

6. The method of claim 1, wherein the coil spring is positioned between the worm and the link to enable:

a compression of the coil spring to urge the link toward the first link position in response to a rotation of the worm in a first direction by the rotary motor; and an expansion of the coil spring to urge the link toward the second link position in response to a rotation of the worm in a second direction by the rotary motor.

7. The method of claim 1, wherein the step of installing the rotary motor further comprises indirectly coupling the rotary motor to the link to facilitate the driving of the catch to the locking position in response to a movement of the link to the first link position, and to facilitate driving of the catch to the unlocking position in response to a movement of the link to the second link position.

8. A retrofit kit for an existing mortise lockset, the retrofit kit comprising:

a rotary motor;

a motor shaft coupled to the rotary motor and extending in a longitudinal direction, the rotary motor configured to selectively drive a rotary displacement of the motor shaft;

a link; and a worm drive assembly configured to translate the rotary displacement of the motor shaft into a movement of the link in the longitudinal direction, the worm drive assembly comprising a worm, a driver, and a spring;

wherein the rotary displacement of the motor shaft causes a rotational displacement of the worm;

wherein the driver includes an opening configured to matingly engage the worm to displace the driver in the longitudinal direction in response to the rotational displacement of the worm, the driver configured to prevent a rotation of the driver in response to the rotational displacement of the worm; and wherein the spring is positioned between the worm and the link and has a first end and a second end, the first end of the spring configured to be coupled to the driver in a manner such that the spring is prevented from rotating in response to the rotational displacement of the worm, the second end of the spring configured to be secured to the link, wherein, as the driver is displaced in response to the rotary displacement of the worm, the spring is configured to urge the movement of the link in the longitudinal direction in a manner that is configured to facilitate displacement of a catch of the existing mortise lockset to one of a locked position and an unlocked position.

9. The retrofit kit of claim 8, further comprising a collar configured to secure the second end of the spring to the link, the collar having an opening positioned and sized to receive a portion of the motor shaft.

10. The retrofit kit of claim 8, further comprising a controller configured to generate a signal to activate the rotary motor to selectively drive the rotary displacement of the motor shaft and the rotational displacement of the worm in a first rotary direction and a second rotary direction, the first rotary direction being opposite to the second rotary direction, and wherein the longitudinal direction comprises a proximal longitudinal direction and a distal longitudinal direction.

11. The retrofit kit of claim 10, wherein, in response to the rotary displacement of the motor shaft and the rotational displacement of the worm in the first rotary direction, the movement of the link is to a proximal link position at which the link facilitates the catch being at the unlocked position, and wherein, in response to the rotary displacement of the motor shaft in the second rotary direction, the movement of the link is to a distal link position at which the link facilitates the catch being at the locked position.

12. A method of retrofitting the existing mortise lockset using the retrofit kit of claim 11, wherein the method comprises:

removing an existing actuator from the existing mortise lockset;

installing the rotary motor to the existing mortise lockset;

engaging the first end of the spring with the worm via the driver; and securing the second end of the spring with the link, wherein the link is engaged with the catch of the existing mortise lockset such that movement of the link between the distal link position and the proximal link position drives the catch between the locked position and the unlocked position.

13. A method of retrofitting an existing mortise lockset, the method comprising:

removing an existing actuator from the existing mortise lockset;

installing a motor to the existing mortise lockset, the motor including a shaft having a worm;

engaging a spring with the worm such that the spring is prevented from rotating during a rotation of the worm by the shaft during an operation of the motor; and coupling the spring with a link such that the spring is positioned between the worm and the link, wherein the link is engaged with a catch of the existing mortise lockset such that operation of the motor rotates the worm, which moves the link via the spring between a first link position and a second link position, which drives the catch between a locking position and an unlocking position.

14. The method of claim 13, wherein engaging the spring with the worm comprises indirectly engaging the spring with the worm via a driver.

15. The method of claim 13, wherein coupling the spring with the link comprises rotationally coupling the spring with the link.

16. The method of claim 13, further comprising installing the link and engaging the link with the catch.

17. The method of claim 13, wherein the step of coupling the spring with the link further comprises engaging the spring with an external thread of a collar, and receiving, in a channel of the collar, an edge of the link.

18. The method of claim 13, wherein the step of installing the motor to the existing mortise lockset further comprises indirectly coupling the motor to the link to facilitate a compression of the spring in response to a rotation of the shaft and the worm in a first direction to urge the link toward one of the first link position or the second link position, and to facilitate an expansion of the spring in response to a rotation of the shaft and the worm in a second direction, opposite to the first direction, to urge the link toward the other of the first link position or the second link position.

19. The method of claim 13, wherein the existing actuator is a solenoid.

20. The method of claim 13, further comprising providing a retrofit kit comprising the motor, the worm, the spring, and the link.

* * * * *